Dec. 27, 1932.  C. L. BAUSCH  1,892,444
TELESCOPIC GOGGLES
Filed Nov. 6, 1929
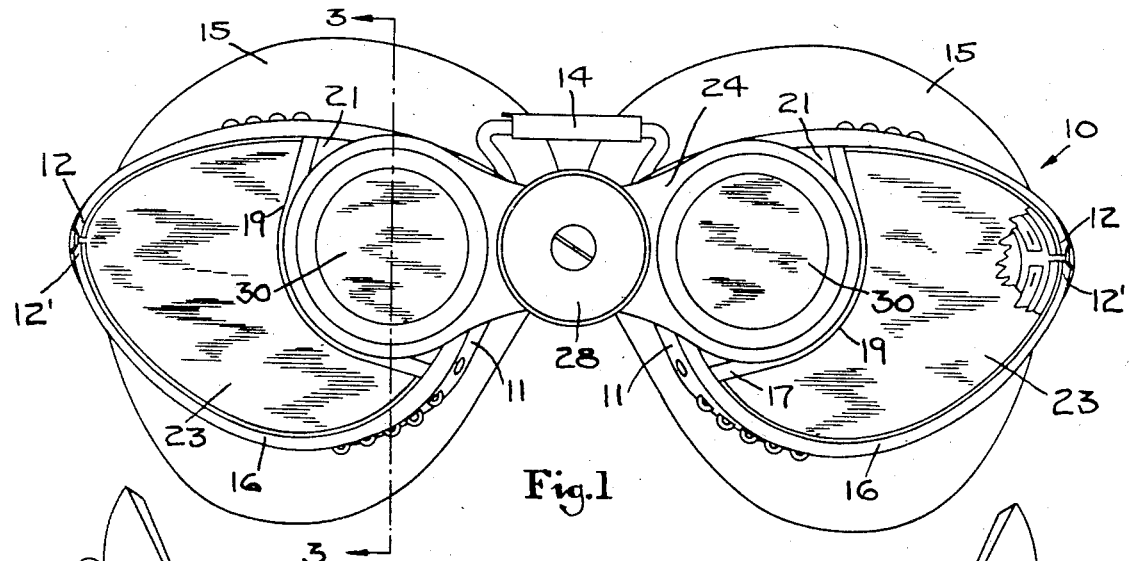
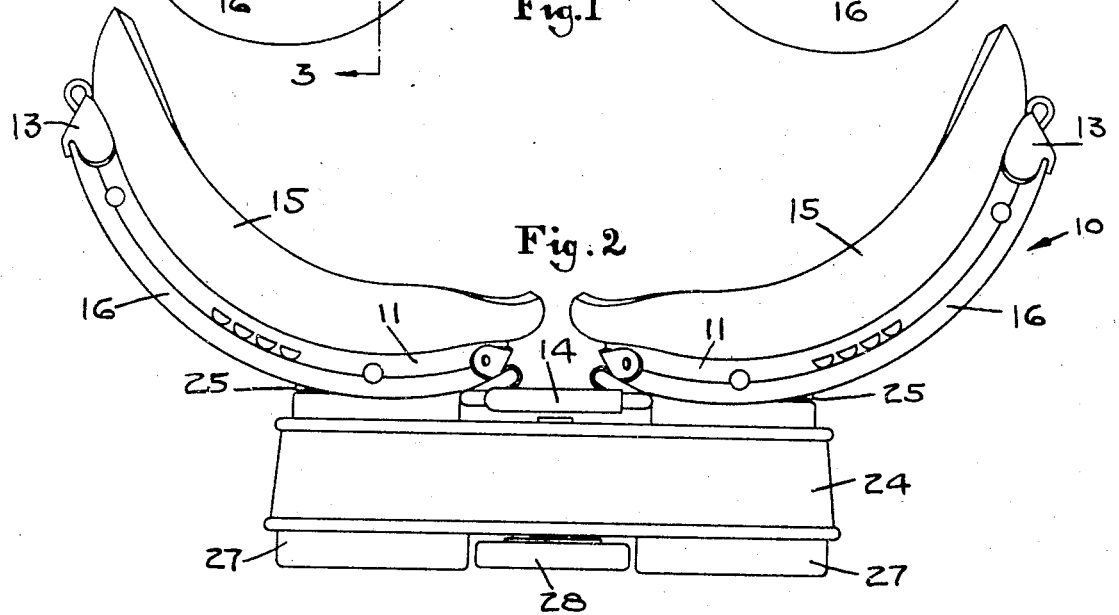
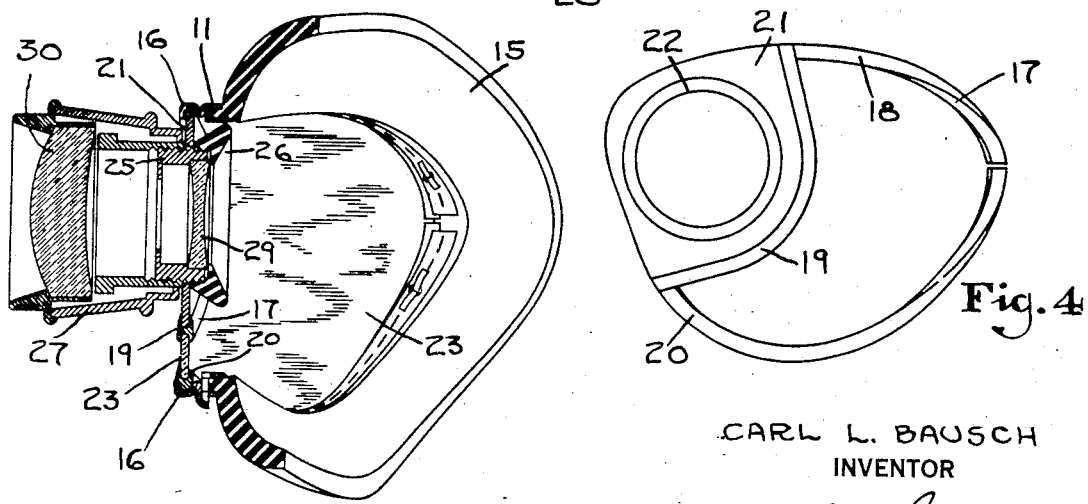
CARL L. BAUSCH
INVENTOR
BY G. A. Ellestad
ATTORNEY Patented Dec. 27, 1932

1,892,444

UNITED STATES PATENT OFFICE

CARL L. BAUSCH, OF ROCHESTER, NEW YORK, ASSIGNOR TO BAUSCH & LOMB OPTICAL COMPANY, OF ROCHESTER, NEW YORK, A CORPORATION OF NEW YORK

TELESCOPIC GOGGLES

Application filed November 6, 1929. Serial No. 405,173.

This invention relates to optical devices and more particularly it has reference to telescopic goggles comprising telescope units mounted in a goggle frame whereby the wearer is selectively provided with vision through the telescope units or through the goggle lenses.

In the pursuits of aviation, it is generally very necessary for the aviators to wear goggles to protect their eyes from strong winds, air currents, dust particles and the like. At certain times, when engaged in military reconnaissance or aerial surveying, for example, it is highly desirable that the pilot or an accompanying observer be equipped with telescope or similar means for distant observation while still having goggle protection for his eyes which will afford ordinary vision through the goggle lenses so that he can observe instruments and read maps which are directly in front of him.

One of the objects of my invention is to provide an improved and efficient device of the character described which will afford the wearer either telescopic vision or vision through goggle lenses. Another object is to provide means whereby a commercial type goggle can be readily converted into telescopic goggles. A further object is to provide improved means for mounting a telescope device in a goggle frame. These and other objects and advantages reside in certain novel features of construction, arrangement and combination of parts as will hereinafter be more fully described and pointed out in the appended claims.

Referring to the drawing:

Fig. 1 is a front view, with parts broken away, of a pair of telescopic goggles embodying my invention.

Fig. 2 is a top plan view of same.

Fig. 3 is a sectional view taken on line 3—3 of Fig. 1.

Fig. 4 is a view of the device which carries the goggle lens and telescope unit.

A preferred embodiment of my invention is illustrated in the drawing wherein 10 indicates, generally, a pair of goggles of the type used by aviators, autoists and the like. This goggle has two eye units each comprising a substantially oval-shaped, split frame member 11 having adjacent ends 12 and 12' which are held in secured position by means of a suitable latch 13. The two eye units are held together by means of a suitable bridge 14 and each frame member 11 carries a sponge rubber cushion 15.

The frame member 11 is provided with a grooved portion 16 in which is mounted the oval shaped support member 17 shown in Fig. 4. The support member 17 comprises three rim portions 18, 19 and 20 which are secured, as by soldering, for example, to a plate 21 having an aperture 22. The rim portions 18, 19 and 20 have inner grooves in which is mounted the lens 23, which, of course, is cut away to provide for the plate member 21 as shown in Fig. 1.

A pair of small field glasses of a well known commercial type, indicated generally at 24, is mounted with its two eye piece tubes 25 projecting through the apertures 22, the tubes being detachably secured to plate 21 by means of the threaded eye caps 26 which abut against the plates 21 adjacent the apertures 22. Slidably mounted on the tubes 25 are the tubes 27 which may be moved axially, for focusing purposes, by means of the screw 28, as is usual in glasses of this type. The two lens elements 29 and 30, forming a telescope of the Galilean type, are carried, respectively, by tubes 25 and 27.

It will be evident from the foregoing description that I am able to provide a pair of telescopic goggles which will selectively afford to the wearer either telescopic vision or vision through goggle lenses. It will be noted from Figs. 1 and 4 that the lens 23 extends laterally of and beneath the plate 21 thereby enabling the wearer to read maps or data which are directly in front of him. Since a commercial type goggle frame is used, the telescopic goggles can be readily modified to use regular, full view goggle lenses by merely removing the support members 17 carrying the lenses 23 and the plates 21 which support the field glass 24. The field glass 24 can, moreover, be easily detached from the plates 21 merely by unscrewing the eye caps 26, thereby permitting one to use the field glass in the usual manner. It will also be noted from the description that the weight of the field glass 24 is carried by the metal plates 21 which in turn are supported in the frames 11. This is an important feature of construction because the weight of the field glass is carried by metallic members so that lenses 23 are not subjected to undue strains.

Various modifications can obviously be made without departing from the spirit of the invention as pointed out in the appended claims.

I claim:

1. A device of the character described comprising a frame, a metallic rim secured in said frame, a plate carried by said rim, said plate having an opening, an optical system carried by said plate in alignment with said opening and a lens member mounted in said rim.

2. A pair of telescopic goggles comprising two eye units connected by a bridge, each of said units comprising a substantially oval-shaped frame, a supporting member mounted in said frame at one end thereof, optical elements carried by said member, and a lens mounted in said frame to provide a vision field extending laterally of and beneath said member.

3. A device of the character described comprising a frame having a groove, a substantially oval-shaped member mounted in said groove, said member comprising a rim portion having a groove and a plate member having an aperture, an optical system carried by said plate member in alignment with said aperture and a transparent member mounted in the groove of said rim portion.

4. A pair of telescopic goggles comprising two eye units connected by a bridge, each of said units comprising a split frame, a substantially ovel-shaped member secured in said frame, said member comprising a split rim portion and a plate member secured thereto, said rim portion having a groove and said plate member having an aperture, a tube mounted in the aperture of said plate, said tube carrying optical elements, and a lens member mounted in the groove of said rim portion, said lens extending laterally of and beneath said plate member.

5. A pair of telescopic goggles comprising two eye units connected by a bridge, each of said units comprising a frame, a substantially oval member mounted in said frame, said member comprising a metallic plate, said plate having a smaller area than the area enclosed by said member, said plate having an opening in which a telescope unit is secured and a lens carried by said member adjacent to said plate.

6. A pair of telescopic goggles comprising two eye units connected by a bridge, a goggle lens carried by each of said units, a plate mounted in each of said units adjacent to the lens, said plates having apertures, a field glass having lens tubes, said tubes being detachably mounted in said apertures.

CARL L. BAUSCH.